J. CARRELET & L. D. DE LONLAY.
INKING DEVICE FOR PRINTING MACHINES.
APPLICATION FILED OCT. 10, 1913.
1,167,268.
Patented Jan. 4, 1916.
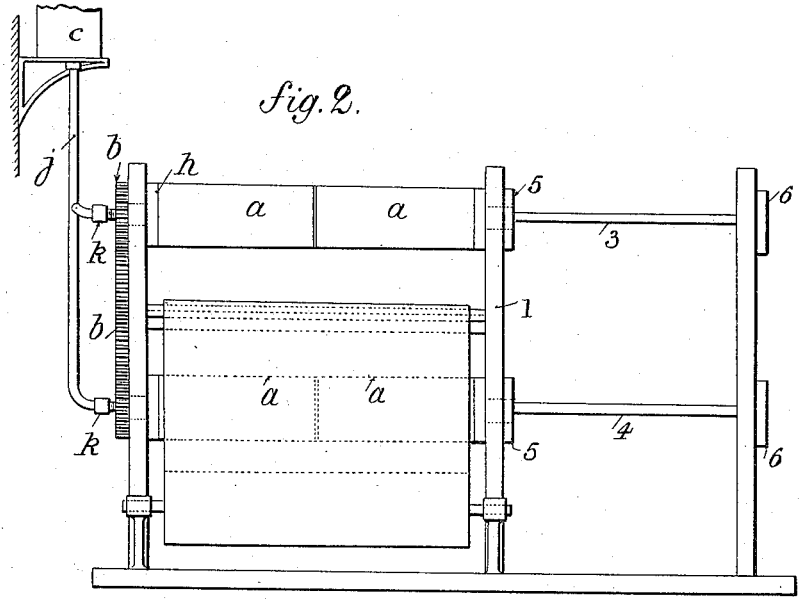
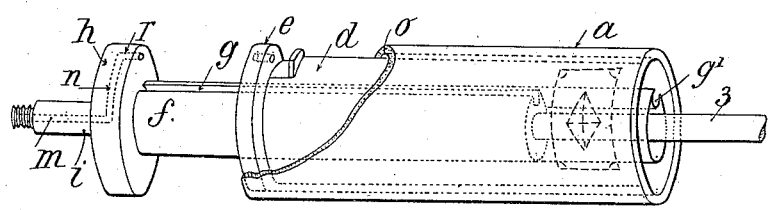
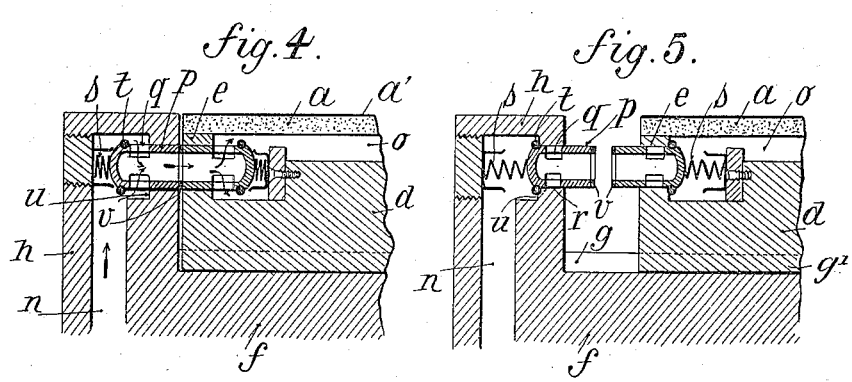
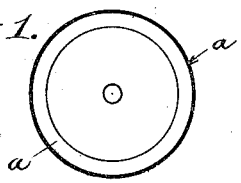
WITNESSES
INVENTORS
JEAN CARRELET
LAURENT DICK DE LONLAY
BY
ATTORNEYS
COLUMBIA PLANOGRAPH CO., WASHINGTON, D. C.

UNITED STATES PATENT OFFICE.

JEAN CARRELET AND LAURENT DICK DE LONLAY, OF PARIS, FRANCE.

INKING DEVICE FOR PRINTING-MACHINES.

1,167,268.  Specification of Letters Patent.  Patented Jan. 4, 1916.

Application filed October 10, 1913. Serial No. 794,417.

*To all whom it may concern:*

Be it known that we, JEAN CARRELET and LAURENT DICK DE LONLAY, citizens of the French Republic, and residing at No. 144 Rue Montmartre, in Paris, France, gentlemen, have invented certain new and useful Improvements in and Relating to Inking Devices for Printing-Machines, of which the following is a complete specification.

This invention has for its object devices to enable impressions to be taken in quick drying inks and colors.

The processes of impression hitherto used consist, as a rule, in laying inks or colors, more or less oleaginous on a block or plate and then transferring the block thus inked to the paper, stuff or other substance to be printed. These processes of impression by transference of the ink or color, however rapidly they can be executed in practice, do not allow the use of inks or colors which dry rapidly, because during the passage from the ink reservoir to the block or plate through the distributers, a passage which is effected in the open air, the ink or color has time to dry, even in the case of rotary machines working at relatively high speed. On the other hand the fact of being obliged to have recourse to inks and colors which dry slowly limits the speed and output of printing machines, notably of rotaries which in practice could work at a much higher rate.

This invention obviates these inconveniences and consists in forcing ink or color under pressure through an ink reservoir made of a porous substance which constitutes at the same time the support of a printing block or plate with openings, made of a comparatively non-porous substance applied directly to the ink reservoir in such a way that the passage of the ink or color to the printing block or plate takes place to the exclusion of air and that it thus becomes possible to employ inks and colors which dry rapidly.

In the annexed drawing: Figure 1 shows a porous cylinder employed in carrying out the invention. Fig. 2 is a view of the whole of a printing machine furnished with cylinders as in Fig. 1. Fig. 3 is a detail view, with a portion removed, of a cylinder being put into position or taken out. Figs. 4 and 5 are two views in section on a larger scale of the device for conducting ink into the porous cylinder carrying the block or plate.

In carrying out the invention a cylinder $a$ is used, Fig. 1, made of a porous substance, the exterior surface of which cylinder carries the block or plate $a^1$. The latter consists of a bed of comparatively non-porous material, for example a thin plate of metal applied to the cylinder or support $a$ by electro-type or other known means. On this non-porous bed is impressed or engraved or transferred by known means the composition, design or other matter to be reproduced in such a way as to obtain a block or plate pierced with openings. Finally the interior space $o$ of the cylinder or support $a$ contains the ink or color under pressure. It is at once understood that the ink or color is forced by the pressure, firstly through the porous substance of the cylinder or support $a$, then through the openings in the block or plate into direct contact with the paper, stuff or other substance to be printed.

With this process and this device it is evident that the cylinder $a$ combines the threefold function of ink reservoir, distributer and inker of the block or plate $a^1$, so that the printing machine is considerably simplified.

As the passage of ink or color is effected without exposure to the air it becomes possible to use inks and colors of a very fluid nature and capable of drying quickly, the advantage of which is that it allows the speed of pulling off to be considerably increased.

If Figs. 2 to 5, showing a complete machine, are examined the block or plate carrying cylinders are seen at $a$ mounted for example, four to a machine. At $b$ is the gearing train of the ordinary type which actuates the machine and at $c$ a reservoir of ink, dye or color under pressure feeding the cylinders $a$.

Fig. 3 shows that the porous cylinders $a$ are first of all mounted on a sleeve $d$ or support sliding on the shaft $f$. This sleeve is terminated by a collar $e$ which supports the cylinder $a$, thus leaving between this latter and its support an annular space. The key may be on the shaft and the groove on the sleeve. A longitudinal groove $g$ in the shaft $f$ and a key $g'$ situated in the interior of $d$ permits the adjustment of the sleeve on the shaft but constrains the sleeve $d$ to rotate with the shaft $g$. At the end of the shaft is a cylindrical head $h$ terminated into a trunnion $i$ carrying one of the gear wheels $b$. The ink coming from the reservoir $c$ under pressure through the pipe $j$ reaches, after passing through a revolving joint $k$ of ordinary construction, an axial passage $m$ in the trunnion $i$ and subsequently a radial passage $n$ in the head $h$. An important part of this machine is the device establishing communication between this passage $n$ and the annular space $o$ which exists between the porous cylinder $a$ and its sleeve support $d$ and cutting off this communication when necessary. This device comprises a lantern valve $p$ having apertures $q$ and mounted to slide in a passage $r$ of the head $h$ (see Fig. 3). This valve is subjected to the action of a spring $s$ which constantly tends to push it outwardly pressing an elastic fitting $t$ projecting on the valve against the part $u$ of the head $h$ forming the seat for the fitting $t$. The elastic fitting $t$ may be replaced by a conical joint. An analogous arrangement exists on the sleeve $d$ comprising also a valve $p$, a spring $s$, a fitting $t$ and the other parties. At the external extremity of each valve $p$ is also provided an elastic fitting or gasket $v$ as shown in Fig. 3.

When the sleeve $d$ carrying the hollow cylinder is in position on the machine, the two valves $p$ occupy the position shown in Fig. 4, i. e. pushed out toward the interior. The springs $s$ are compressed, the gaskets $v$ are strongly pressed against each other to form a tight joint and besides a communication is established between the passage $n$ and the space $o$ by the apertures $q$ and the interior of the valves $p$ which together form a passage open at both ends. Any other valve system producing the same result may be used.

When it is desired to change the block or plate, the sleeve $d$ is removed from the machine. The valves $p$ are at once pushed toward the outside by their respective springs $s$, the fittings $t$ or the conical joints of each of them are pressed against the respective seats $u$ and the apertures $q$ are closed by the fact of their engaging with the passages carrying the valves. In these conditions not only is communication cut off between $u$ and $o$ but further the passage $n$ and the space $o$ are individually and automatically closed by the sole fact of the removal of the sleeve $d$ from the head $h$. Thus any escape of ink either from the passage $n$ or from the space $o$ is automatically precluded.

When the sleeve $d$ is put into position again with a new cylinder on, the communication between $o$ and $n$ is reëstablished automatically. In order to allow the removal of the cylinders $a$ from the machine, the latter comprises laterally a supplementary frame 2 distant from part 1 of the machine frame by a distance at least equal to one of the cylinders $a$. Spindles 3 and 4 prolong up to the frame 2 the axes of the rolls or drums to which they are attached by an arrangement which will allow their removal in order to allow the removal of the cylinders $a$ while leaving in position the axes of the drums properly so called. The supporting blocks 5 and 6 will be arranged accordingly.

The invention applies to any impression by porosity. The machines may therefore be conceived not only under the rotary form but also under any other forms and particularly as flat machines.

The cylinders carrying the blocks or plates such as $a$ may be placed with several of them around the same cylinder which serves to support the strip to be printed so as for example to be able to make successively on the same strip several impressions, superposed or juxtaposed.

What we claim is:

1. In a device of the class described, a rotary member; means for feeding ink under pressure to said rotary member; a roller removably associated with said rotary member and having means whereby it is constrained to rotate with said member, said roller comprising an exterior lateral layer of comparatively non-porous material forming a printing surface with apertures therein; a layer of porous material beneath said non-porous layer wherethrough the ink is fed to the apertured printing surface, said roller being hollow beneath said porous layer and thereby forming an ink container therein, said roller and said rotating member having registering passageways; and valves positioned in said passageways whereby the ink flows from said rotating member to said roller to the exclusion of air and whereby the flow is controlled.

2. In a device of the class described, a hollow cylinder of porous material; a shell of comparatively non-porous material fixed on the cylinder and applied by electro-deposition, the said shell forming a printing surface thereon, said shell being apertured where said printing surface is formed; means for moving the cylinder; means for feeding ink into said hollow cylinder during its movement under a pressure such as to cause the ink to flow to the printing surface through the pores of the material of the cylinder and hence through the apertures of the shell.

3. In a machine of the class described, a rotary inker comprising a porous-cylinder and a sleeve carrying the same and forming between them an ink space, a drum on which the rotary inker is adapted to be mounted, the drum having a head provided with an ink passage, the said head serving as a stop for the sleeve when the cylinder and sleeve are in working position, and a device for establishing automatically a communication between the ink space of the rotary inker and the said ink passage and consisting of two lantern valves opposed to each other and mounted to slide in passages arranged respectively, the one in the said sleeve and the other in the head of the drum, the said valves being moved inward in their respective passages, when the cylinder and its supporting sleeve are in position, to establish the desired communication, and springs for moving the said valves outward to seat the same and interrupt the said communication when the cylinder and its supporting sleeve are not in working position.

4. In a rotary machine of the class described, a drum having an axis, porous cylinders which carry the blocks or plates, and means for mounting the porous cylinders, comprising a sleeve fitted onto the axis of the drum, the said sleeve carrying at its ends rims on which rest the porous cylinder, thereby forming an annular ink space between the sleeve and the cylinder.

In testimony whereof we have hereunto placed our hands, at Paris, France, this 24th day of September 1913.

JEAN CARRELET.
LAURENT DICK DE LONLAY.

In the presence of two witnesses:
HANSON C. COXE,
HENRY SCHWARTZ.

Copies of this patent may be obtained for five cents each, by addressing the "Commissioner of Patents, Washington, D. C."